United States Patent [19]

Kürzi et al.

[11] 4,193,202
[45] Mar. 18, 1980

[54] APPARATUS AND METHOD FOR DETERMINING THE LOCATION OF PERIPHERAL POINTS OF BODIES

[75] Inventors: Albert Kürzi; Willy Mersiovsky, both of Zurich, Switzerland

[73] Assignee: BBC Brown Boveri & Company Limited, Baden, Switzerland

[21] Appl. No.: 944,785

[22] Filed: Sep. 22, 1978

[30] Foreign Application Priority Data

Sep. 23, 1977 [CH] Switzerland .................. 11647/77

[51] Int. Cl.$^2$ .............................................. G01B 7/02
[52] U.S. Cl. .................................. 33/174 L; 33/172 E; 33/DIG. 7
[58] Field of Search ................ 33/143 L, 147 N, 166, 33/172 E, 174 L, 174 Q, 174 PC, DIG. 7, DIG. 13

[56] References Cited

U.S. PATENT DOCUMENTS

| | | | |
|---|---|---|---|
| 2,172,719 | 9/1939 | Weant | 33/147 N |
| 2,554,171 | 5/1951 | Brunot et al. | 33/172 E |
| 3,805,393 | 4/1974 | Lemelson | 33/143 L |
| 3,844,047 | 10/1974 | Carson | 33/166 |
| 3,879,993 | 4/1975 | Sorbie | 33/174 Q |

FOREIGN PATENT DOCUMENTS 652895  11/1962  Canada .................. 33/174 L

Primary Examiner—Richard R. Stearns
Attorney, Agent, or Firm—Burns, Doane, Swecker & Mathis

[57] ABSTRACT

An apparatus and method for determining the geometrical position of peripheral points of bodies, especially of bodies of rotation, is disclosed. The points are measured relative to an axis of the bodies by a sensing gauge head. The head is preferably carried on an upper carriage of two carriages that move at right angles with respect to one another. The sensing gauge head carries a stretched wire which serves as a measuring face. When the measuring wire makes contact with the body to be measured, an electric circuit is closed to trigger an optical signal. Acoustic and/or motor controlling signals may also be triggered by the contact with the body. A contact brush may also be provided on the sensing gauge head to warn the operator that contact with the measuring wire is imminent.

15 Claims, 5 Drawing Figures

APPARATUS AND METHOD FOR DETERMINING THE LOCATION OF PERIPHERAL POINTS OF BODIES

BACKGROUND AND SUMMARY OF THE INVENTION

The present invention relates to a method and apparatus for determining the position of peripheral points of bodies, especially of bodies of rotation, relative to an axis of the body.

In the case of large bodies, especially of bodies of rotation, it is oftentimes necessary to locate certain points or sectional areas of the surface of the body at a specific distance from an axis or to determine the distance of the points or areas from the axis of the body.

Conventional measuring systems can be used for this purpose and include for example machines for measuring co-ordinates and parallel surface gauges used in conjunction with lathes or plane tables having an apparatus to rotate the body to be measured.

If such measurements require a certain degree of accuracy, the known measuring systems must be operated with great care which consumes a relatively great amount of time. Furthermore, the accuracy of the measurement will depend to a large extent on the skill of the individual operator.

The last-mentioned factor will be particularly important if several points or sectional areas of the body at an equal distance from the reference axis are to be measured and if the gauge must be reset for each individual point due to the shape of the body.

A practical example of a body which is measured in this way includes a turbine rotor that is equipped with buckets arranged in a bucket ring. Due to inaccuracies occurring during manufacture and assembly, peripheral points of the installed buckets will be at non-uniform distances from the axis of rotation. Such an arrangement would result in non-uniform radial clearances between the bucket ring and an inner housing wall after installation. A minimum radial clearance is desirable, however, so as to attain a maximum degree of efficiency. The minimal clearance has been accomplished heretofore by inserting the rotor into a lower housing part and by filing each individual bucket radially until the desired clearance has been reached. The other blades of the turbine rotor are then machined down to the size of the reference blades of the buckets. This method is tedious and time-consuming and must often be repeated until the clearances meet the required tolerances.

In order to minimize the expense and the processing time connected with the known methods of the prior art an attempt was made to find a way to machine turbine rotors equipped with blade rings to a finished size independently of the housing. For this purpose a rotor-finishing bench was provided which required an apparatus to measure the peripheral extent of the bucket points. Such an apparatus had to meet the above-stated requirement for a quick and problem-free operation which provides both uniform and precise measuring results. Another requirement was that the device provide objective instrumentation, thus eliminating inaccuracies resulting from the actions of the operator. These inaccuracies may result for example from non-uniform pressure by the operator in applying the known measuring devices to the body to be measured.

Accordingly, it is an object of the present invention to provide a measurement method and device which overcomes the disadvantages of the known prior art.

Another object of the present invention is to provide a measurement device having an electrical contact indication feature.

The apparatus proposed by the present invention includes two carriages which can be moved in two directions perpendicularly with respect to each other. A sensing gauge head is fastened to the upper carriage by means of a cantilever arm. The sensing gauge head includes a measuring wire which is under mechanical stress forming one portion of an electric circuit. The circuit is wired in such a manner that the circuit will close when the measuring wire comes in contact with the body to be measured. The circuit includes an indicating device which services to indicate the contact of the measuring wire with the body to be measured. A low voltage current source is provided to energize the circuit.

BRIEF DESCRIPTION OF THE DRAWINGS

The present invention is described with reference to the accompanying drawings wherein like members bear like reference numerals and wherein.

DETAILED DESCRIPTION OF THE PREFERRED EMBODIMENTS

Figure 1:
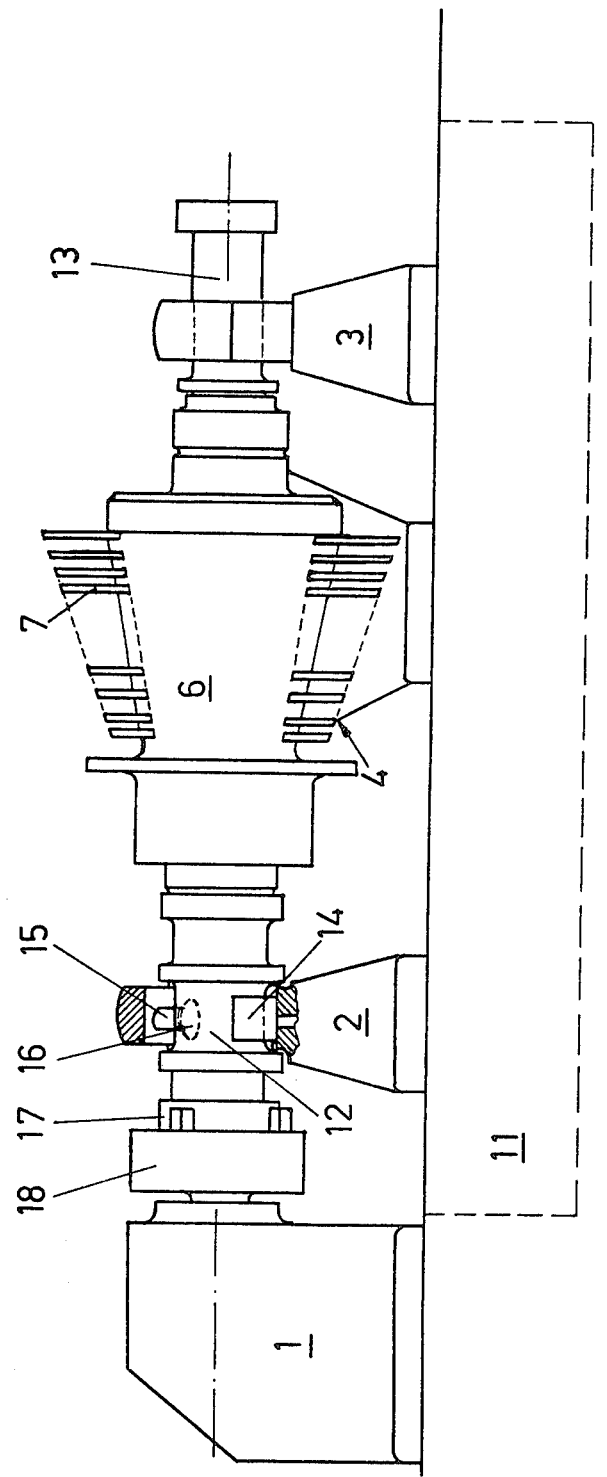
FIG. 1 is a side view of a rotor-finishing bench having an apparatus according to the present invention.
Figure 2:
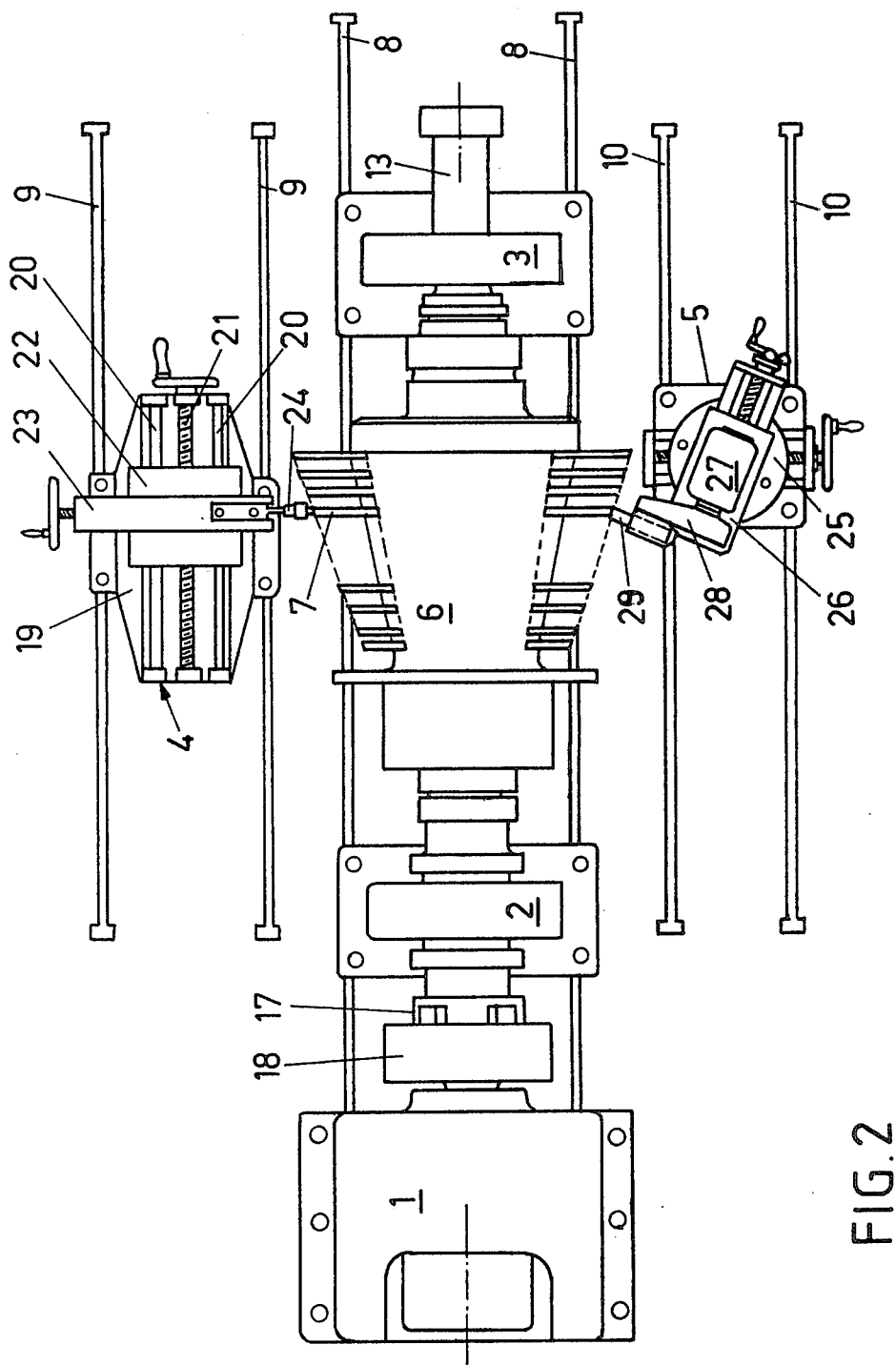
FIG. 2 is a top view of the bench and apparatus of FIG. 1.

A rotor-finishing bench with reference to FIGS. 1 and 2 includes a headstock 1 and two supports 2 and 3. A measuring device is provided on one side of a turbine rotor 6 with a grinder (see FIG. 2) provided on the other side. The main components of the bench can be moved along a plurality of respective rails 8, 9, 10 which are installed within a floor to permit an alignment of the main components with the body involved, e.g. the turbine rotor 6 equipped with a plurality of bucket rings 7. Between the center rails 8 there is provided a pit 11, (see FIG. 1), which can be covered up, serving to accomodate large-sized rotors between the supports 2 and 3. The rotor 6 is mounted at the two supports 2 and 3 by first and second bearing pins 12 and 13 of the rotor. In this way, and to accomodate bearing pins of various diameters, a bearing section 14 is provided for each support. Each section 14 is vertically adjustable within the lower portion of the support and is hydraulically lubricated. Finally, each support includes two radially adjustable guide bolts having sliding parts 16.

A spindle which is mounted on the headstock 1 and driven by an electric motor carries a universal or Cardan joint 18 which drives a left shaft flange 17 of the turbine shaft. With reference to FIG. 2, the measuring device 4 includes a socket 19 having circular guides 20 and a screw spindle 21 which are arranged parallel to the axis of the rotor-finishing bench. The guides 20 and spindle 21 serve to guide, or respectively move laterally a longitudinal carriage 22 which in turn carries a radial carriage 23. The radial carriage 23 can move perpendicularly to the axis of the rotor-finishing bench. The carriage 23 like the carriage 22 travels within circular guides upon rotation of a screw spindle. The carriage 23 carries at its end facing the turbine rotor 6 a sensing gauge head 24 which includes the measuring elements of the present invention.

The grinder 5 which is located on the other side of the rotor-finishing bench is of standard design and includes a turntable 25 which can be moved transversely to the axis of the rotor-finishing bench on circular guides by means of a screw spindle. The grinder turntable 25 carries a support 26 having an electric motor 27 and an enclosed belt drive 28 for driving a grinding disk 29. The turntable 25 is equipped with a graduated scale and can swivel about a vertical axis for setting a proper miter angle during the peripheral grinding of the bucket ring 7.

Figure 3:
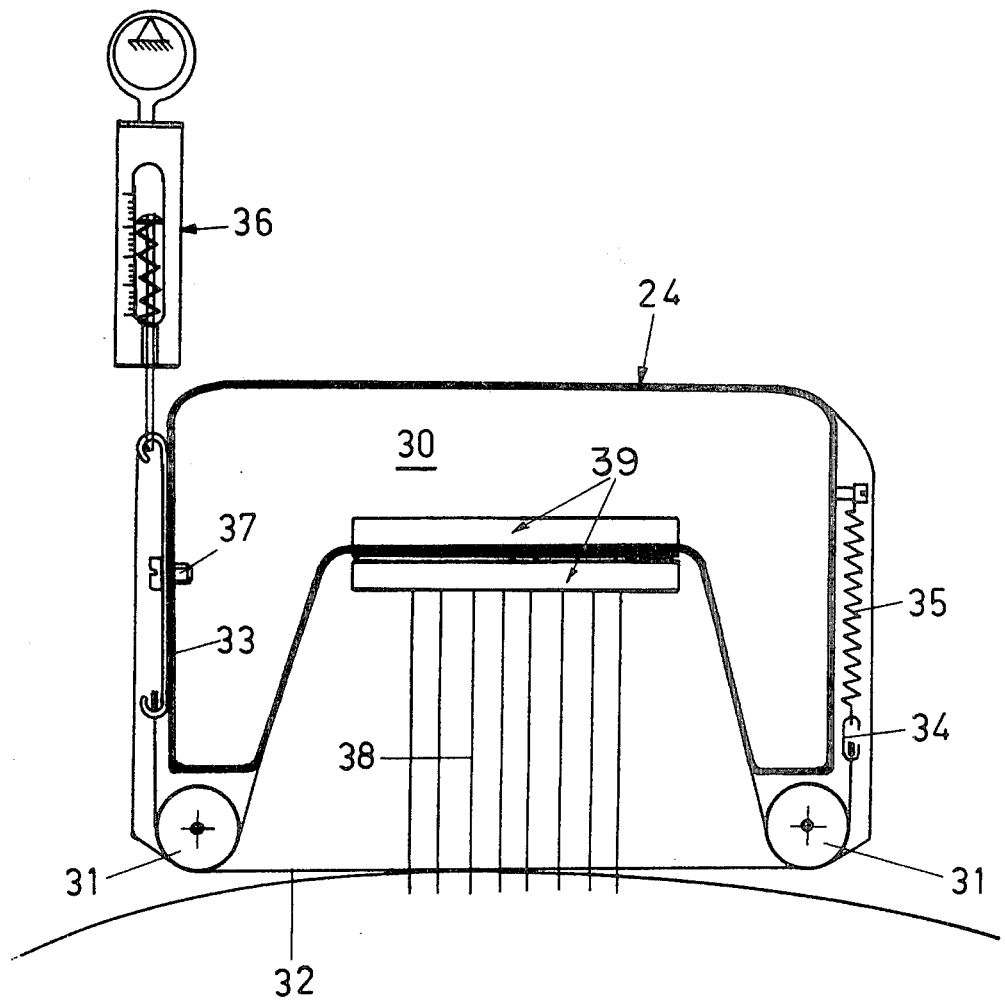
FIG. 3 is an end view of the sensing gauge head of the apparatus of FIG. 1.

With reference now to FIG. 3, the sensing gauge head 24 is illustrated in schematic form and includes a measuring crosspiece 30. At either end of the two sides of the crosspiece 30 are placed rollers 31 with a very thin measuring wire 32, preferably a piano wire, stretched tightly over grooves of the rollers. The left end of the wire 32 is fastened to a rigid eyelet strip 33. The right end of the wire is fastened to an eye 34 of a helical tension spring 35. The wire 32 is stretched very tightly, preferably to approximately 80% of its breaking point. The extent of tension can be set for example by a balance scale 36 which is provided at the upper eye of the eyelet strip 33 by loosening the binding screw 37. When the wire is stretched to the desired value, the screw 37 is then tightened.

A contact brush 38 at the center of the crosspiece, is fastened to the measuring crosspiece 30. The brush 38 is electrically insulated with respect to the wire and crosspiece by two insulating blocks 39. The contact brush 38 consists of several thin, springy metal leafs, having points which protrude slightly beyond the wire 32. In this way, the leafs will make an initial contact with the body when the sensing head approaches the point of the periphery to be measured. The leafs will thereby close an electric circuit such as is illustrated in the circuit diagram of FIG. 4. A warning lamp 41 will accordingly light up to alert an operator of the imminent contact by the measuring wire so that he will advance the radial carriage more cautiously.

Figure 4:
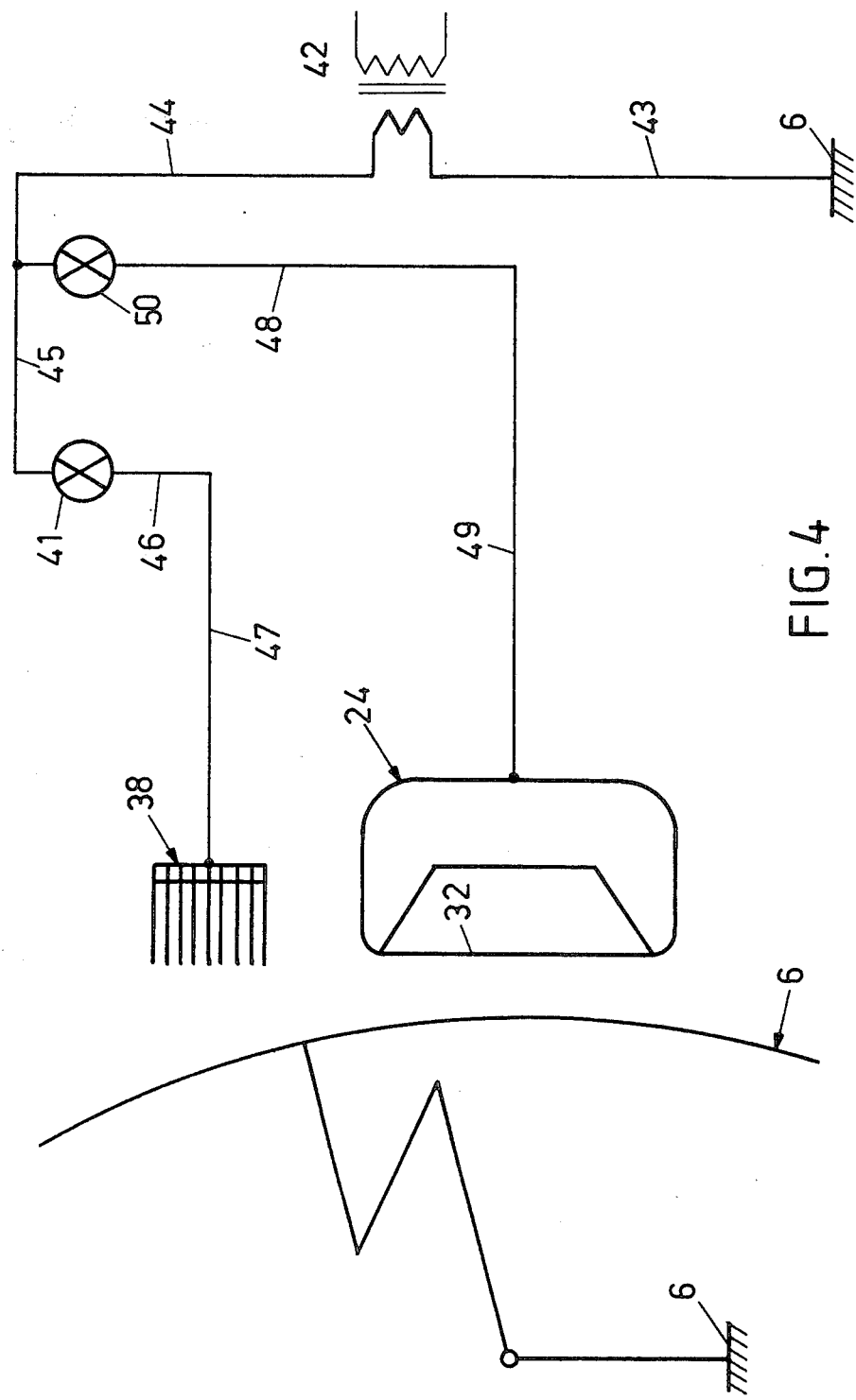
FIG. 4 is a schematic illustration of the circuit of the sensing gauge head of FIG. 3; and, FIG. 5 is a side view of another sensing gauge head according to the present invention.

The electrical portion of the sensing gauge head, with reference to the circuit diagram of FIG. 4, includes a transformer 42 which reduces the network current to 12 volts. The low voltage is applied through the conductors 43, 49 across the rotor-finishing bench and thus across the work piece, e.g. the rotor 6. The low voltage is thereby applied across the measuring crosspiece 30 of the sensing gauge head 24 and across the measuring wire 32. A low voltage is furthermore applied across the contact brush 38 which is fastened to and electrically insulated from the measuring crosspiece. The above-mentioned warning lamp 41, and a measuring control lamp 50 are respectively arranged in the two branch circuits including the conductors 44-45-46-47 and 44-45-48-49 respective. The lamp 50 indicates the actual occurrence of contact between the measuring wire 32 and the rotor 6.

Figure 5:
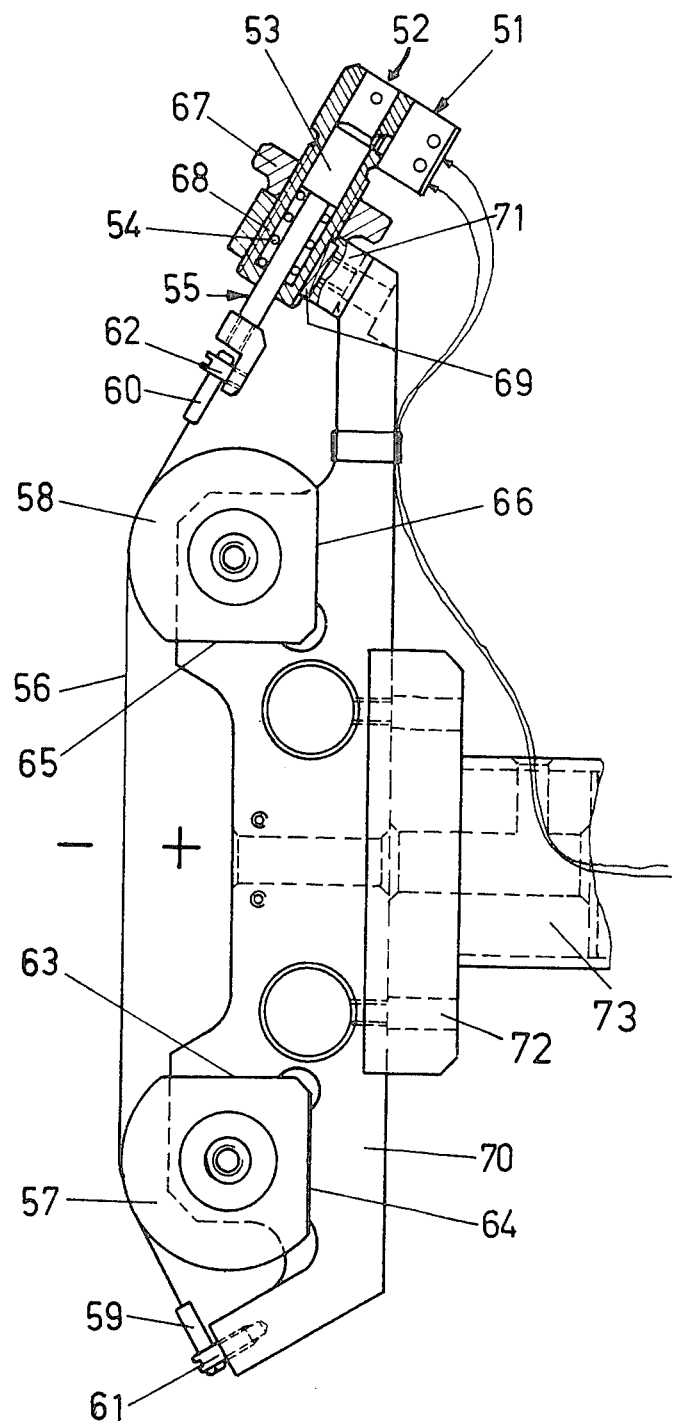

With reference to FIG. 5, a practical example of a sensing gauge head may be arranged without the use of a contact brush 38. The sensing head of FIG. 5 is employed in conjunction with a radial carriage which can be operated either manually or by means of a motor, with the manual drive being blocked when the motor drive is in operation. When contact of the head with the rotor has been accomplished, the motor drive is shut off by means of a switch located within the circuit of the measuring control lamp. In the event that the apparatus breaks down or the measuring wire snaps, a microswitch 51 is provided at the upper end of the sensing gauge head as a safety measure and includes a switching pin 52 which is actuated by a head 53 of a guide bolt 55. A spring 54 loads the bolt 55 and serves to stretch the measuring wire 56 which is guided over two stationary guide members 57 and 58. The two ends 59 and 60 of the wire 56 are fastened tightly to the threaded bolts 61 and 62 without the need for any additional bracing.

If the measuring wire 56 should break, the spring 54 will push the guide bolt 55 upwardly, thereby actuating the microswitch 51 and shutting off the main drive. A fault-indicating lamp is automatically switched on at the same time.

By providing relatively flattened areas 63, 64 and 65, 66 on each of the guide members 57, 58 with each guide member having two flattened areas arranged at a right angle to each other (for example area 63 with respect to area 64), the apparatus has the advantage that the measuring wire 56 can be placed in a position that is exactly rectangular to the longitudinal axis of the radial carriage by a proper grinding of the flattened areas.

A precise setting of the position of the switching pin 52 of the microswitch relative to the head 53 of the guide bolt 55 is accomplished by means of a knurled nut 67 which turns about the threads of a guide bush 68. The knurled nut is secured by a cotter pin 69 to prevent turning of the nut relative to a guide block 71 which is screwed onto a part 70 of the measuring crosspiece. The flange 72 is made of insulative material with the part 70 of the measuring crosspiece fastened thereto. The flange 72 forms part of a cantilever arm 73 which serves to fasten the sensing gauge head to the radial carriage. The wire 56, of course, is connected to a source of voltage in a circuit such as is illustrated in FIG. 4. In this way, the wire 56 serves substantially the same purpose as the wire 32.

The two carriages 22 and 23 of the measuring device 4 permits an exact positioning and dimensional determination of the point of contact at a precisely vertical setting of the measuring wire 56 within a horizontal central plane of the component to be measured such as the turbine rotor 6. The dimensional determination relative to the axis of the rotor 6 is made for example by micrometers of the carriages such as are commonly found on lathes. It is possible, as already mentioned, to utilize the current pulse, triggered by contact with the rotor, for the control of the setting of the radial carriage. A similar control can be applied to the longitudinal carriage while scanning in a longitudinal direction so that the scanning by contact can be accomplished radially as well as axially.

The repeat accuracy of positioning or measuring is within about one or a few millionths of a meter. The measurement can also be carried out when the workpiece is rotating, for example, during the manufacturing operation.

It is also possible to provide, in addition to the optical indication of contact by the measuring wire with the turbine and the automatic switch for a motor of the carrige feed, an acoustic signal device in the low voltage circuit of the system, to be triggered at the moment of measurable wire contact.

In operation, the body to be measured such as the turbine rotor 6 is mounted on the rotor-finishing bench. The sensing gauge head is moved radially inwardly towards the turbine rotor. If the sensing gauge head includes a contact brush 38, contact of the brush 38 with the rotor will activate an alarm such as a light to warn the operator.

Subsequently, contact of the wire (e.g. either 32, 56) with the rotor will activate another alarm to indicate such contact. The apparatus of the present invention may be used with a grinding mechanism so as to properly machine the body to be measured to a preferred configuration.

The principles, preferred embodiments and modes of operation of the present invention have been described in the foregoing specification. The invention which is intended to be protected, is not, however, to be limited to the particular forms disclosed, since these are illustrative and not restrictive examples. Variations and changes may be made by those skilled in the art without departing from the spirit and scope of the present invention.

What is claimed is:

1. An apparatus for determining the position of peripheral points of a body to be measured, such as a body of rotation, relative to an axis of the body, comprising:
   a sensing gauge head member carried by means for moving said gauge head member toward the body to be measured;
   a flexible member under mechanical stress between two portions of the sensing gauge head; and,
   signal means for indicating that the flexible member is in contact with the body to be measured, the signal means being operatively connected to the flexible member.

2. The apparatus of claim 1 further comprising:
   carriage means for carrying the sensing gauge head member, the carriage means including first and second carriages which are movable perpendicularly with respect to one another.

3. The apparatus of claim 2 wherein the sensing gauge head member is carried on a cantilever arm member of one of the carriages.

4. The apparatus of claim 2 further comprising motor means for driving the carriage means radially with respect to the body to be measured, the motor means being deactivated when the flexible member is in contact with the body to be measured.

5. The apparatus of claim 4 further comprising switching means to deactivate the motor means if the flexible member should break.

6. The apparatus of claim 1 wherein the sensing gauge head member includes a pair of rollers each having a peripheral groove, the flexible member being stretched over the rollers.

7. The apparatus of claim 6 wherein one end of the flexible member is attached to a spring of the sensing gauge head member and another end of the flexible member is attached to an eyelet strip member which is releasably attachable to the sensing gauge head member at various locations relative to the sensing gauge head member.

8. The apparatus of claim 1 wherein the sensing gauge head member includes a pair of stationary guide members each having a peripheral groove, the flexible member being stretched over the stationary guide members.

9. The apparatus of claim 1 wherein the flexible member is a metallic wire.

10. The apparatus of claim 1 wherein the signal means includes an electrical circuit, the circuit being closed when the flexible member is in contact with the body to be measured.

11. The apparatus of claim 10 wherein the flexible member and the body to be measured are electrically conductive and wherein the electrical circuit supplies a low voltage to the flexible member with the electrical circuit including both the flexible member and the body to be measured.

12. The apparatus of claim 11 further comprising contact brush means for indicating that contact between the flexible member and the body to be measured is imminent.

13. The apparatus of claim 12 wherein the contact brush means includes a contact brush which is supplied with a low voltage by the electrical circuit.

14. A method of determining the position of peripheral points of a body to be measured, such as a body of rotation, relative to an axis of the body, comprising the steps of:
   urging a sensing gauge head member towards the body to be measured;
   contacting the body to be measured with a flexible member which is under mechanical stress across two portions of the sensing gauge head member; and,
   signalling that the flexible member has contacted the body to be measured.

15. The method of claim 14 further comprising the step of
   contacting the body to be measured with a contact brush immediately prior to contacting the body to be measured with the flexible member; and,
   indicating that contact with the flexible member by the body to be measured is imminent.

* * * * *